Sept. 1, 1970    J. S. HOLT, JR    3,526,902

PNEUMATIC RECORDER PEN MOTOR

Filed Nov. 1, 1968    11 Sheets-Sheet 1

*INVENTOR.*
JOSEPH S. HOLT, Jr.
BY
*Lawrence H. Poston*
AGENT

Sept. 1, 1970  J. S. HOLT, JR  3,526,902
PNEUMATIC RECORDER PEN MOTOR
Filed Nov. 1, 1968  11 Sheets-Sheet 2

Sept. 1, 1970  J. S. HOLT, JR  3,526,902
PNEUMATIC RECORDER PEN MOTOR
Filed Nov. 1, 1968  11 Sheets-Sheet 11

# United States Patent Office 3,526,902
Patented Sept. 1, 1970

3,526,902
PNEUMATIC RECORDER PEN MOTOR
Joseph S. Holt, Jr., Foxboro, Mass., assignor to The Foxboro Company, Foxboro, Mass., a corporation of Massachusetts
Filed Nov. 1, 1968, Ser. No. 772,594
Int. Cl. G01d 5/06
U.S. Cl. 346—139                                    3 Claims

ABSTRACT OF THE DISCLOSURE

A pen motor assembly in which a bellows is directly connected to a pen movement structure with optimum power and linearity with minimal friction, and with structural duplicatability, based on free length assembly of the bellows coupled with predetermined load-length bellows return spring. Further, the method of construction and assembly of this pen motor. Further, a multiple unit of such pen motors in a multiple pen system in minimal space and with the pen motors interchangeable in the multiple unit.

SPECIFICATION OF THE INVENTION

This invention relates to pneumatic recorders for use in process and/or energy control instrumentation, and has particular reference to pen movement systems, pen motor units therefor, and the method of construction and assembly of such pen motor units.

Pen motor units are often in the form of spring-loaded bellows wherein a pneumatic signal to the bellows, against the action of the spring results in mechanical movement which is applied to operate a recording pen with respect to a moving chart. Full stroke, power, and linearity in the operation of such pen motor units, as well as duplicatability, are desirable conditions which are provided by this invention in small space, with simple construction, minimal friction and based on the use of bellows and springs therefor which do not have to be held to excessive dimensional and operational standards. That is, the bellows and springs are normally produced, off the shelf items, which are assembled in accordance with this invention in their free length condition.

Because of the ease provided by this invention of achieving essentially identical and readily interchangeable pen motor units, groups of such units may be used in multiple pen recorders with individual pen units for each such pen, without special adjustment, connection or calibration needs as between different pen motors in a multiple pen group.

The simplicity and interchangeability of pen motors according to this invention makes possible multiple unit assemblies in small space. This invention provides special angling and staggering of such units in such assemblies to further this compactness.

Thus, this invention makes possible a multiple pen recorder system, with, for example, a strip chart, with a simple stacking of pens, a simple group of parallel arbors serving the pens, and a single compact unit of pen motors serving the arbors.

This invention lends itself to the modern needs and concepts of reduced size in the direction of miniaturization so necessary to the complex and multiple process and energy control systems of today, wherein indication and recording are ever increasingly important in terms of costly results of inaccurate or insufficient knowledge of actual system operation and condition values.

Other objects and advantages of this invention will be in part apparent and in part pointed out hereinafter and in the accompanying drawings, wherein.

Figure 1:
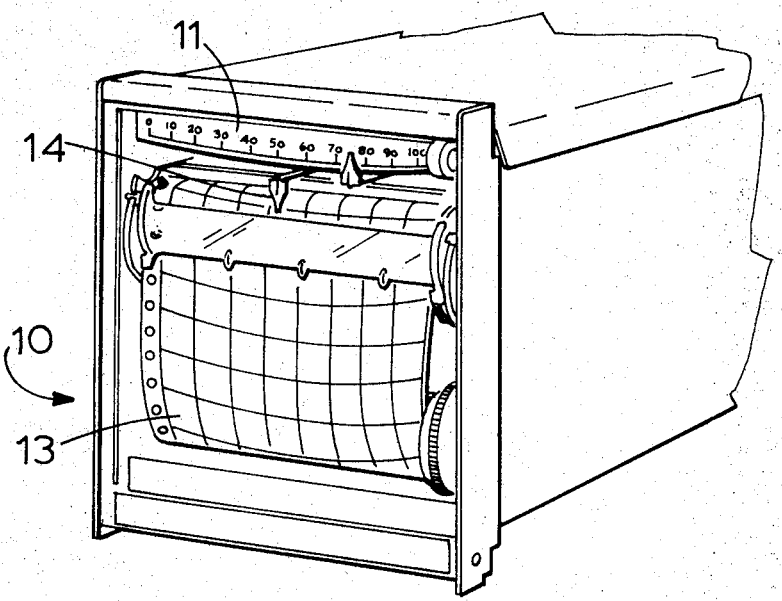
FIG. 1 is a front view of a pneumatic recorder, in fragment, incorporating concepts of this invention, with associate signal deviation indicator.
Figure 2:
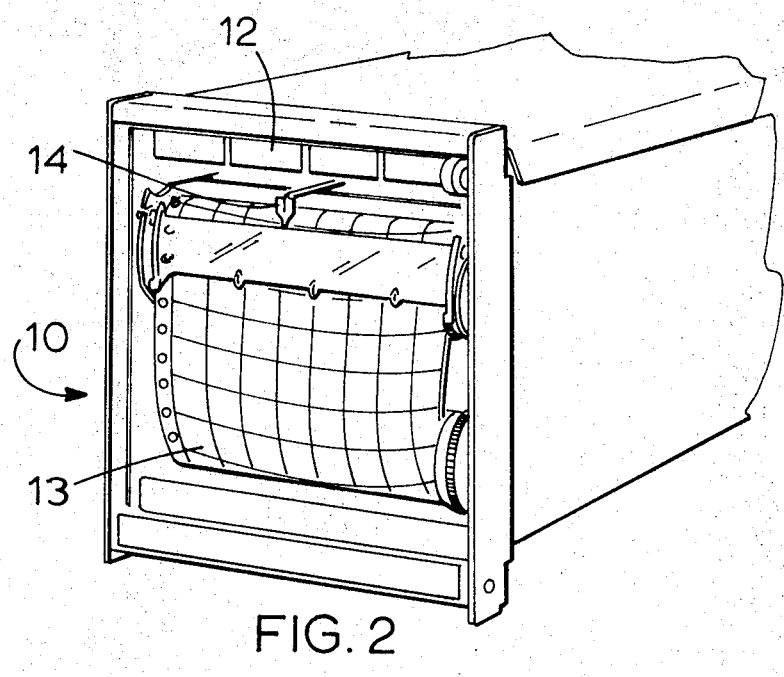
FIG. 2 is a view like that of FIG. 1, with associate alarm light indicator panel.

In FIGS. 1 and 2, a general showing of the face of a recorder 10 is presented as illustrative of the nature of an instrument embodying the concepts of this invention. In FIG. 1, a deviation indicator 11, and in FIG. 2, an alarm light panel 12, are shown as examples of variants usable with the main recorder. This main recorder utilizes a moving chart 13 and recorder pens 14.

Figure 3:
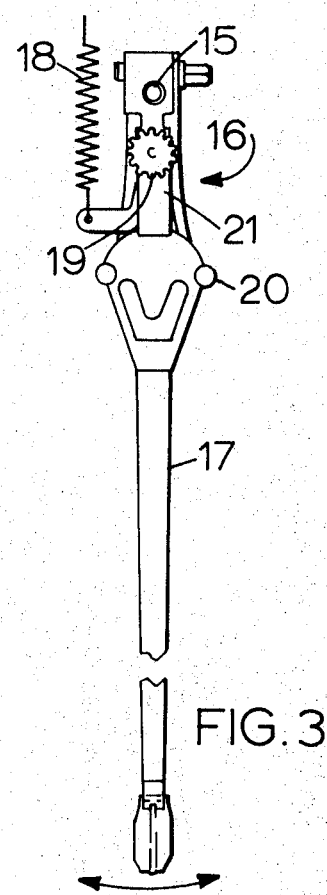
FIG. 3 is a plan view of a pen and its immediate support structures, for this invention.
Figure 7:
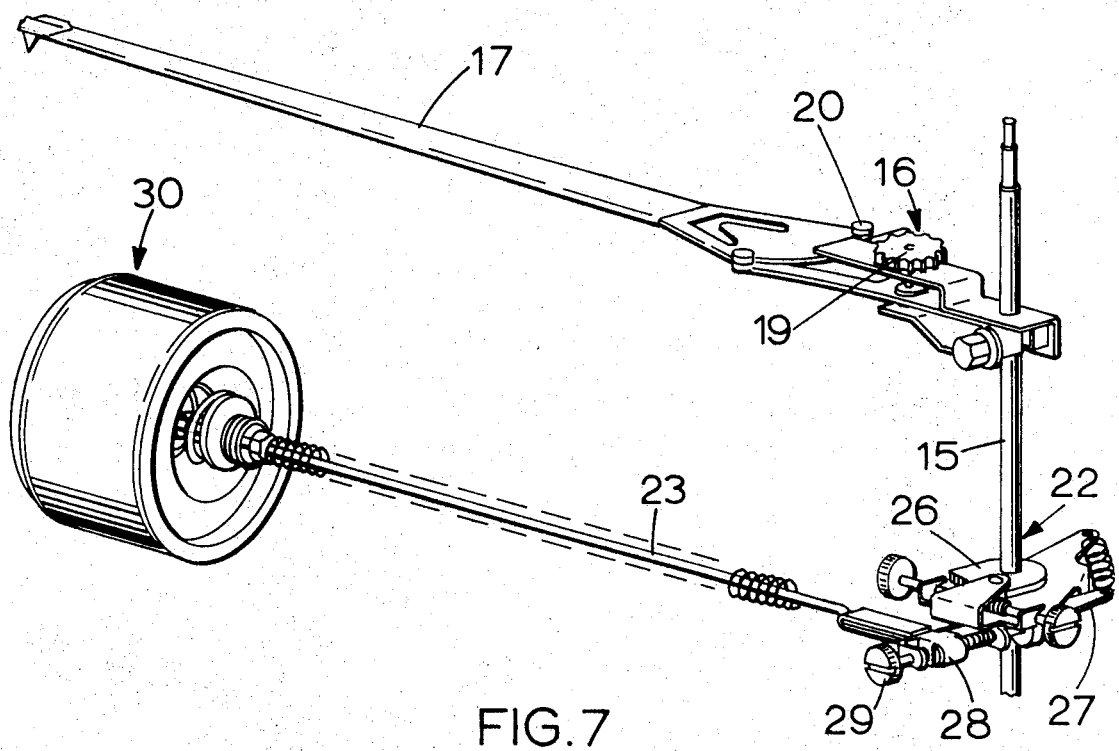
FIG. 7 is a skeletal showing of a pen drive system according to this invention, from the pen motor to the pen itself.

In FIGS. 3 through 6, and completely in FIG. 7, a pen movement system of a recorder embodying this invention, is illustrated. In FIG. 3, a pen drive arbor 15 has secured thereto a pen support assembly 16, with a pen 17 mounted thereon. The arbor 15 is rotatable, as will be seen hereinafter, in response to and in accordance with a pneumatic signal representative of a variable value of process or energy parameter or condition. The support assembly 16 has a spring 18 attached thereto as a zero return bias on the pen 17 and its support assembly. Further, an adjustment screw 19 is usable to vary the contact pressure of the pen on a recording chart. The pen 17 is snap-mounted on the support assembly between a pair of side studs 20 and underneath a pen end overhang tongue 21.

Figure 4:
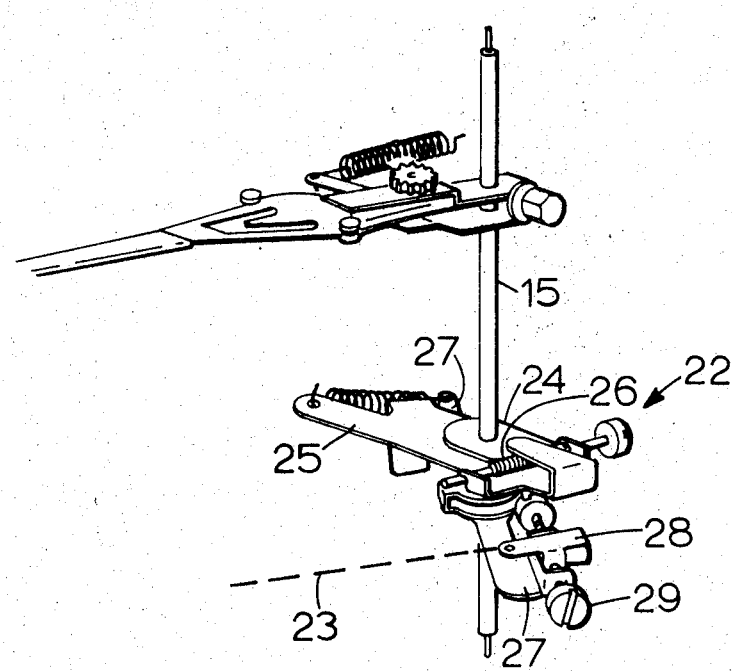
FIG. 4 is a perspective of a pen drive system for this invention, including part of the structure of FIG. 3.
Figure 5:
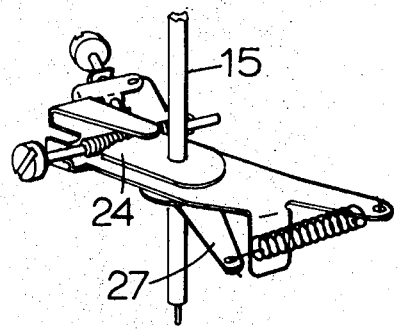
FIG. 5 is a perspective development of a part of the system of FIG. 4.
Figure 6:
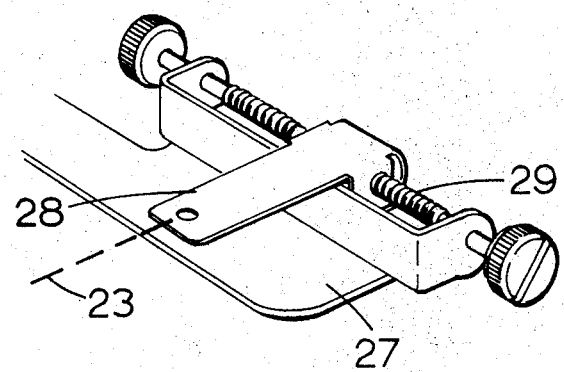
FIG. 6 is a further perspective of a part of the structure of FIGS. 4 and 5.

In FIG. 4, a perspective of the FIG. 3 structure is presented, and further, a connection assembly 22 illustrates the operative joining of a shaft 23 from a pen motor, see FIG. 7, to the arbor 15. The connection assembly 22 comprises a sector gear 24 fixed to the arbor 15, an arm 25 pivoted on the arbor 15 and used as an angular adjustment device through a worm gear 26 and sector gear 24. An over-range plate 27 is pivoted on the arbor 15 and spring biased to arm 25. Further, a connector tongue 28 for the pen motor shaft 23 is radially adjustable on the arm 27 with respect to the arbor 15 through an adjustment screw 29.

The complete schematic of a single pen movement system of FIG. 7 includes the structures of FIGS. 3 through 6 and illustrates a pen motor assembly 30, which exemplifies an area of particular importance in the concepts of this invention. Note that there are only three friction points, the end pivots of the arbor 15, and the connction of the pen motor shaft 23 to the arbor system at the tongue 28.

Figure 8:
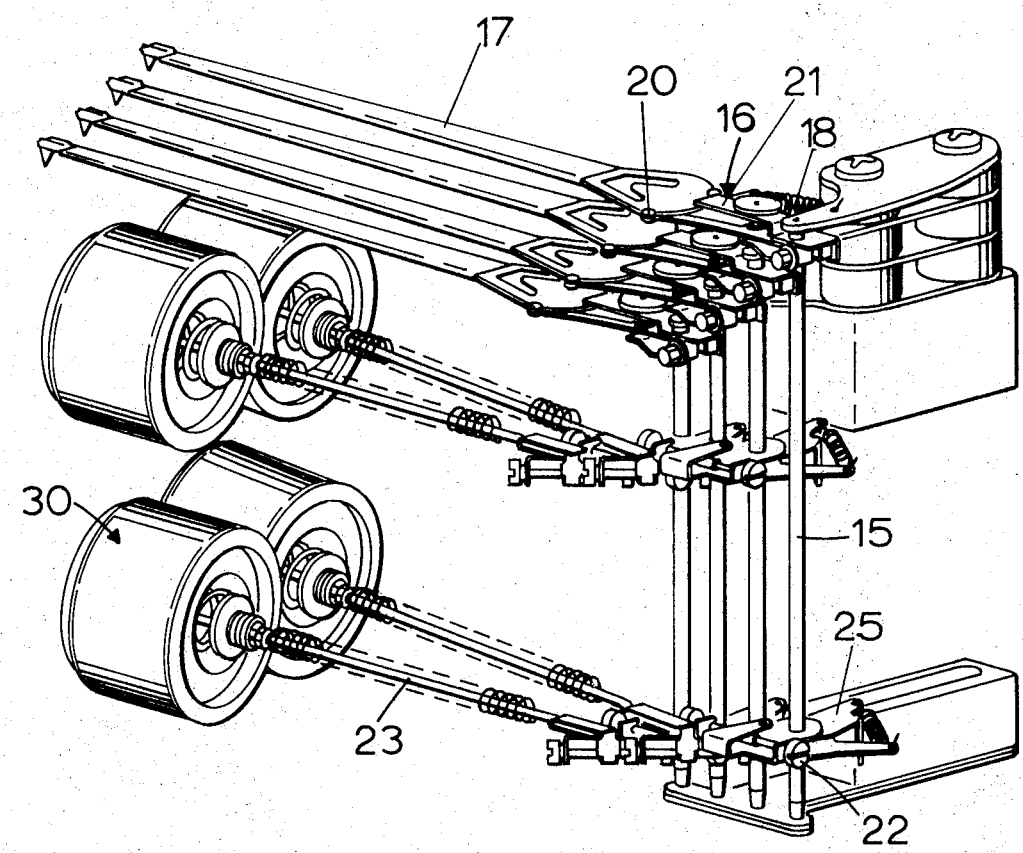
FIG. 8 is a skeletal showing of a multiple pen drive system according to this invention.

In FIG. 8, a schematic of a multiple system combining four single systems as in FIG. 7 illustrates stacking of the pen arms, single plane parallelism of the arbors, and the angling approaches of the pen motor shafts to the arbors in the provision of a compact structure of a multiple pen drive system.

Figure 9:
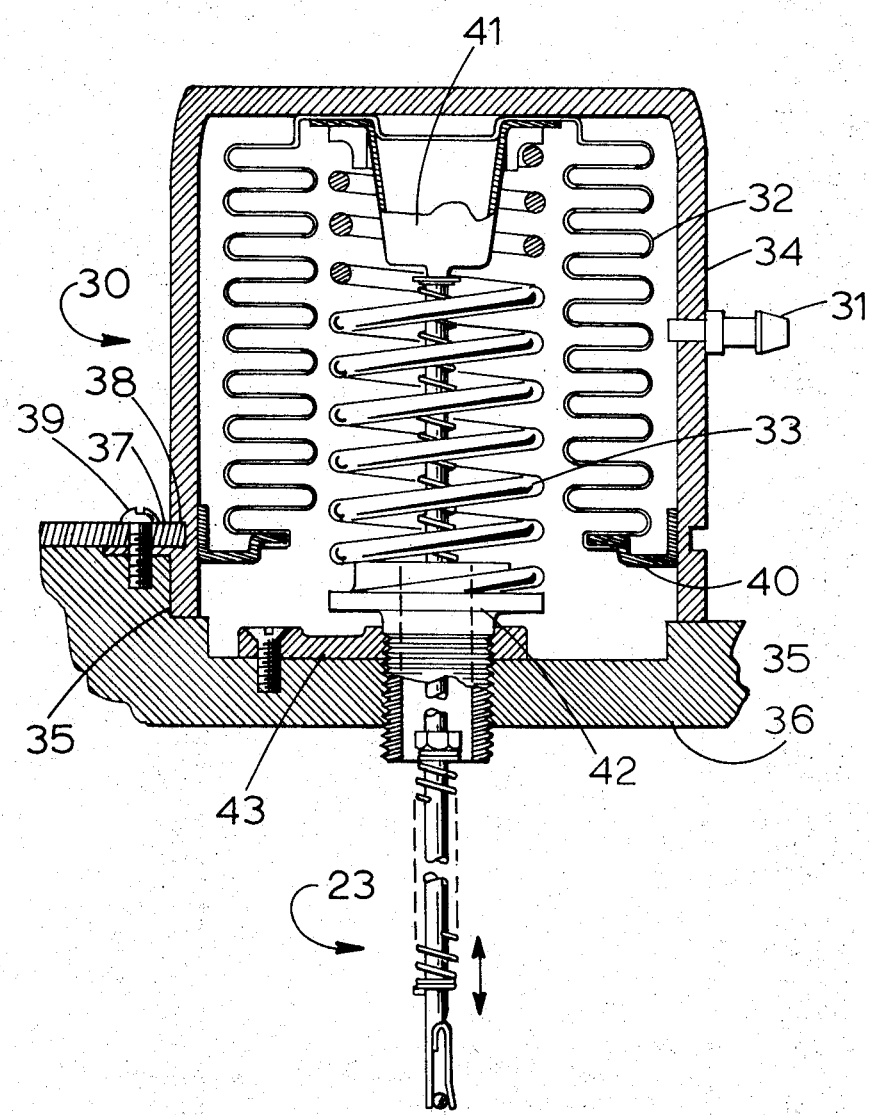
FIG. 9 is an illustration of a pen motor assembly according to this invention, with selected cut-aways.

The FIG. 9 pen motor assembly 30 is a bellows device which receives a pneumatic signal through an input 31 to compress a bellows 32 to a degree representative of the signal and which results in essentially straight line axial movement of the pen motor shaft 23, to turn the arbor 15, FIGS. 3 through 8.

The pen motor 30 is a particularly useful and unique device. It is readily duplicatable in size and operating characteristics, with the advantages of simple and inexpensive construction, and of interchangeability, with the support block of FIGS. 17, 18, and 19. A multiple motor assembly can be made to use minimal space while using essentially identical pen motors to operate the pen systems, themselves conveniently and compactly arranged, see FIG. 8. Such compact assembly is accomplished by staggering and angling the pen motor assemblies and mounting them at different levels, as shown by their seatings in FIGS. 17, 18, and 19 and in FIGS. 11, 12, and 13. Thus simple, identical linkages are used with each of the pen motors, with minimum backlash and friction in each. Each such linkage has only two journals and one linkage connection, see FIG. 7. Prior art systems use more linkage with consequently more backlash and friction.

Considering the single pen motor of FIG. 9, critical elements are the bellows 32 and the bellows return spring 33. It is difficult and expensive to manufacture these items to precise dimensions and operating characteristics. This invention uses conventional, normal cost, off-the-shelf springs and bellows, and through special adjustment and the structure as illustrated in FIG. 9, the manufacturing variances are minimized as to their adverse effects.

The FIG. 9 assembly comprises a cup-housing 34, the bellows 32, in cup form also, and nested in the cup-housing, base-to-base; the bellows spring 33; mounting means for the spring 33; and the pen motor shaft assembly 23.

The cup-housing 34 has the peripheral lip of its open end seated in a bored recess 35 in the support block 36, and is held to this block by clamp plate means 37 in an outer face peripheral slot 38 of the cup-housing, by means of bolts such as at 39.

The bellows 32 is centrally mounted in the housing 34 in the special circumstance that in a condition of no load, the bellows is at its free-length dimension. In assembly, the bellows is simply placed freely into the housing, and securely mounted and sealed therein by annular ring mounting 40, as between the open end peripheral lip of the bellows and the inner wall of the housing, providing a pressure chamber between the bellows and the housing.

As will be seen hereinafter, the bellows helical spring 33, from an initial mounting in off-the-shelf, free length condition also, is adjusted into desired pre-load condition with respect to a depth dimension of the cup-housing 34, to provide a precisely adjusted assembly from off-the-shelf, free length parts.

Figure 10:
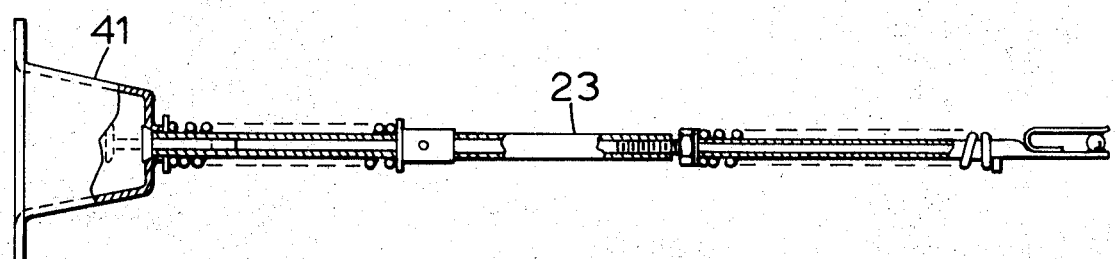
FIG. 10 is a showing of a pen motor connector shaft, according to this invention.

Inside the bellows 32, centrally of its base, a hollow cup 41 provides an inner end mounting for the bellows shaft assembly 23, detailed in FIG. 10. This shaft assembly 23 extends freely through the spring 33, through a spring mounting stud 42, and through the pen motor support block 36 to its arbor system connection as shown generally at 22, FIG. 8. Accordingly the bellows shaft assembly 23 is supported and connected only at its ends. Through the spring and telescoping arrangements illustrated in FIG. 10, the shaft assembly 23 normally has a fixed length under usual operating conditions, but may be lengthwise shortened under overrange conditions.

The bellows return spring 33 is a helix coil, end mounted within the bellows 32 as between the base of the bellows and its mounting stud 42. The stud 42 is threadedly mounted in the support block and restrained from rotation by a suitable plastic friction clamp. Accordingly, screw-thread lengthwise adjustment of the stud 42 varies the load of the spring 33 on the bellows 32. This adjustment is made prior to assembly, as illustrated in the method step FIGS. 15 and 16.

Figure 15:
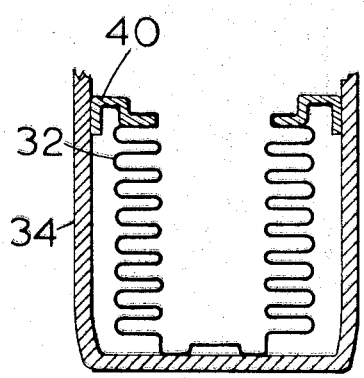
FIG. 15 is a showing of one step in a method of assembly according to this invention.

As a first step of assembly of the pen motor unit, FIG. 15, the bellows 32 is placed in the cup-housing 32, in free-length condition. The bellows is then connected and sealed to the inside of the housing by the annular ring 40. The shaft assembly 23, including the hollow cup 41 is mounted within the bellows, on and around a raised central portion of the bellows base.

Figure 16:
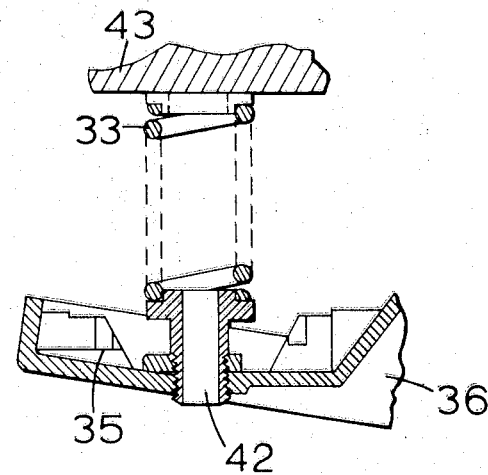
FIG. 16 is a showing of another step in the method of FIG. 15.

Prior to assembly, FIG. 16, the bellows spring is mounted vertically on the threaded hollow stud 42 in the block 36, with its free end weighted as at 43. The weight 43 is spaced from the cup-housing seat 35 of the block 36 a distance representative of the depth of the cup-housing, with allowance for the thicknesses of the bellows base and the base of the hollow stud 41. The spring 33 is first taken in its free length condition and placed between the stud 42 and the weight 43. The stud 42 is then adjusted in the block 36 until the desired pre-loading of the spring is accomplished in relation to the selected depth dimension of the cup-housing. Thereafter, the spring 33 is freed from the fixture weight 43, the structure of FIG. 10 placed with the spring, and the cup-housing mounted over the spring and secured to the block 36, thereby achieving in assembly, the same pre-load value as was established with the pre-assembly weight and adjustment. One example is of the order of two pounds with respect to a cup-housing depth dimension of the order of 1.7 inches. This preloading can readily be made precise to small tolerances to provide duplicatability and interchangeability in pen motors according to this invention. Thus optimum power and stroke, and improved linearity by operation curve area selection, may be achieved with simple, normal cost, off-the-shelf springs and bellows.

Figure 11:
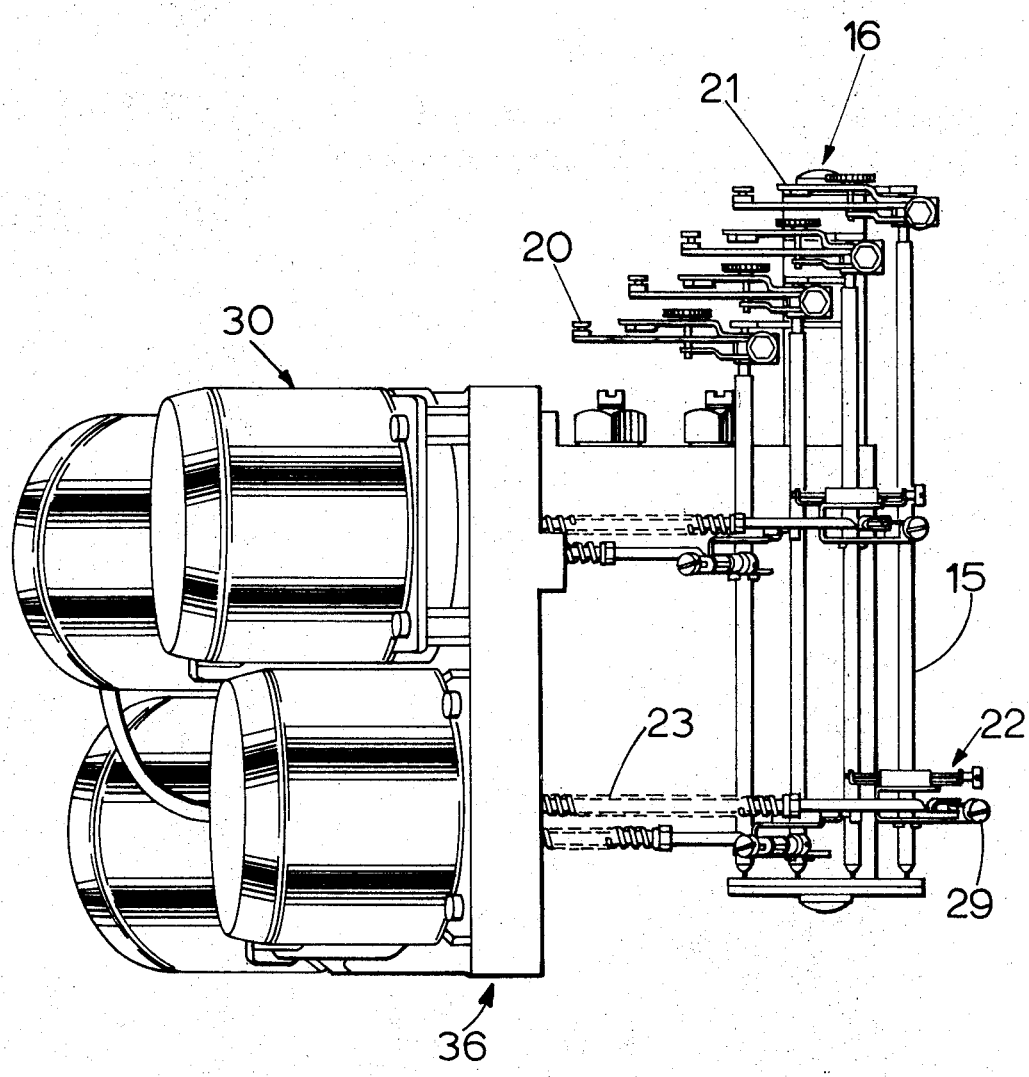
FIG. 11 is a side view of a multiple pen motor system, according to this invention.
Figure 12:
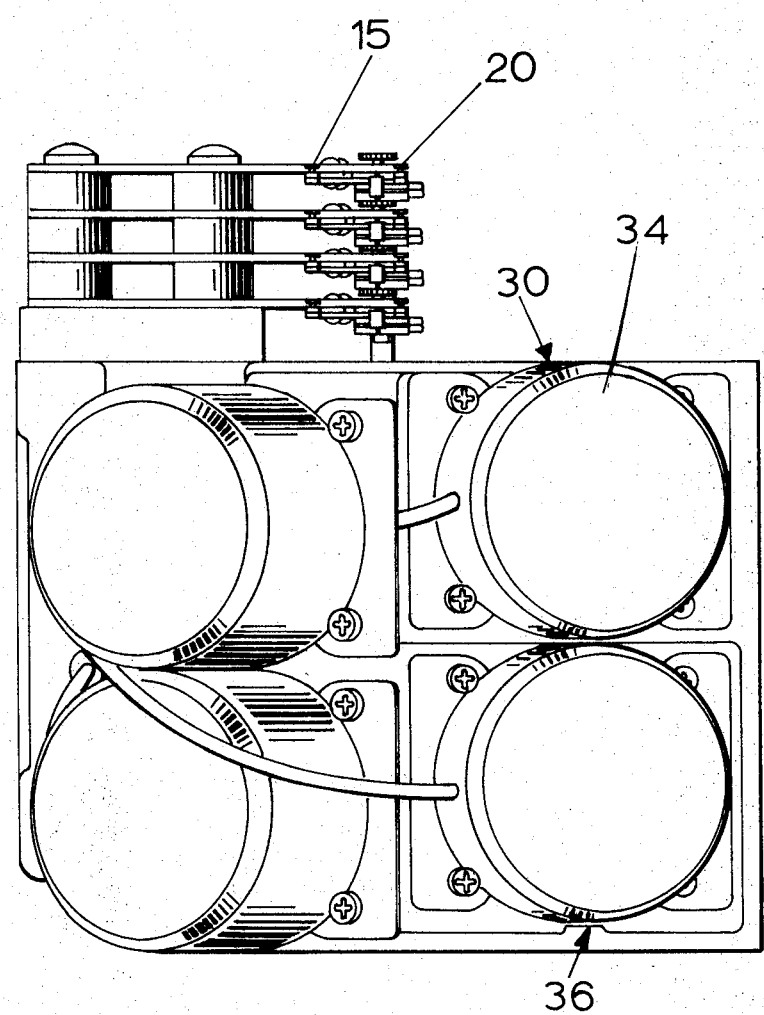
FIG. 12 is a left end view of the structure of FIG. 11.
Figure 13:
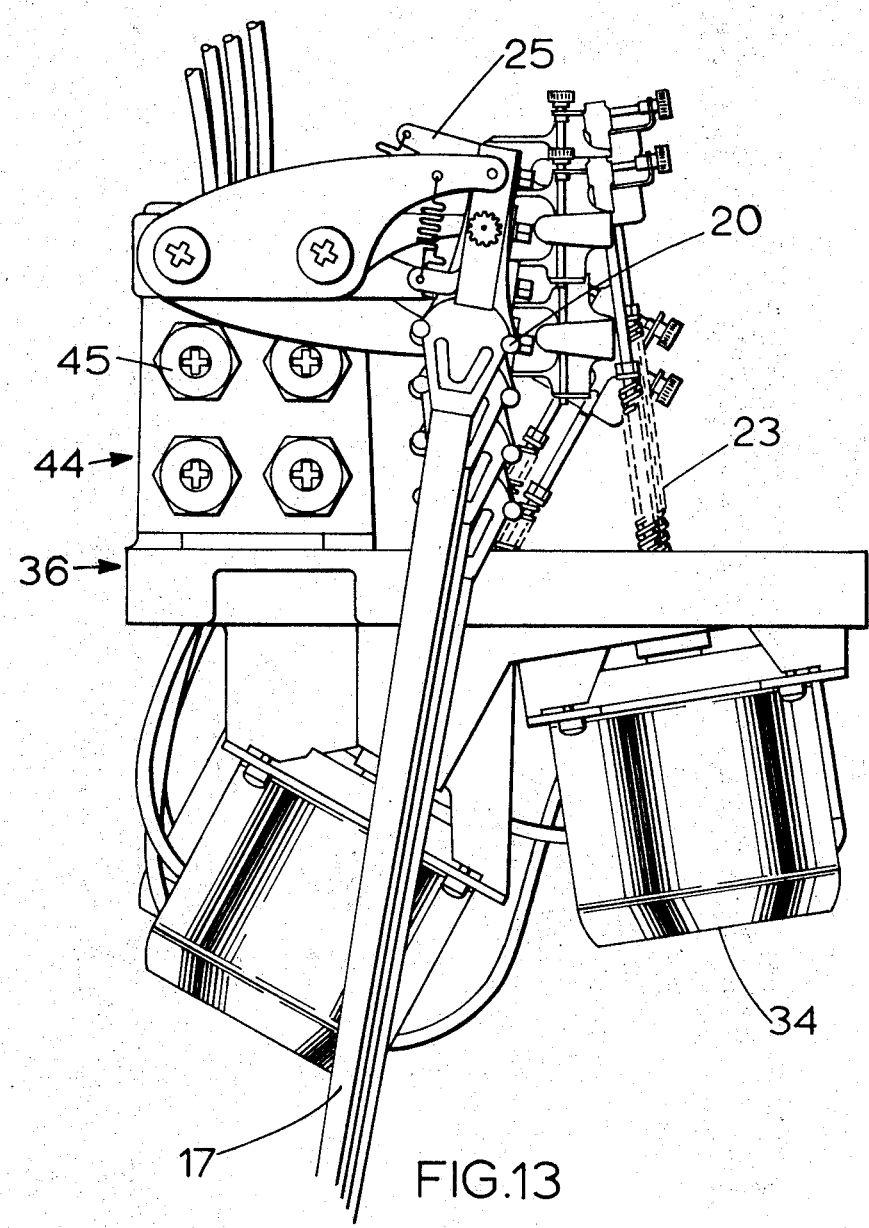
FIG. 13 is a top view of the structure of FIGS. 11 and 12.

FIGS. 11, 12 and 13 are various views of the same multiple pen system structure as an example of an assembly according to this invention. Like reference numbers are applied to like elements in these figures, with respect to previous figures.

Figure 14:
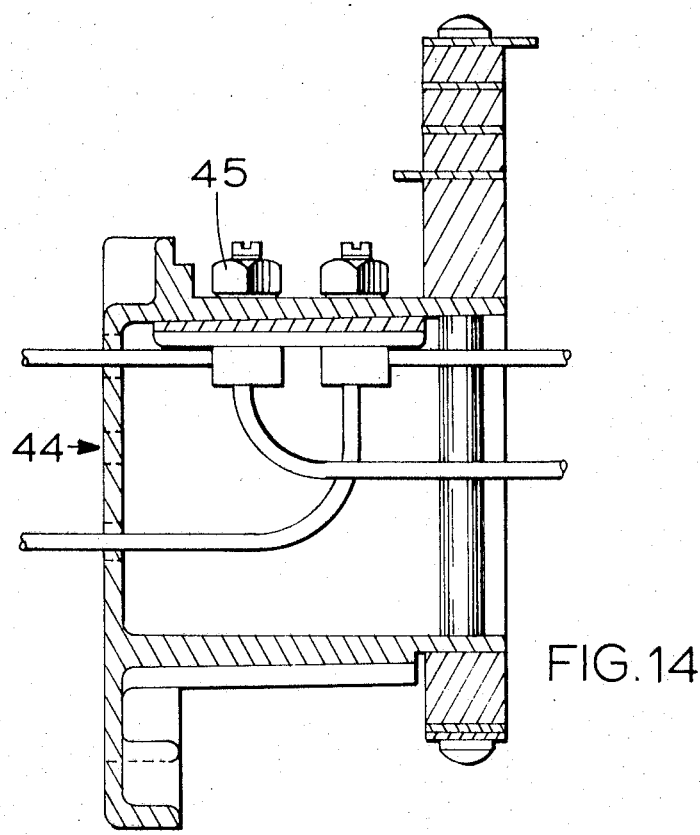
FIG. 14 is a showing of pneumatic restrictors in signal inputs to bellows pen motors in the structure of FIGS. 11, 12, 13.

In FIG. 14 a pneumatic restrictor unit 44 illustrates, in a showing of two input pneumatic lines, one for each bellows, restrictor structure as at 45, adjustable as required. In the four unit structure of FIGS. 11, 12, and 13, there are four such restrictors, see FIG. 13.

FIGS. 15 and 16 relate to the construction and assembly method of pen motors according to this invention, as previously described herein.

Figure 17:
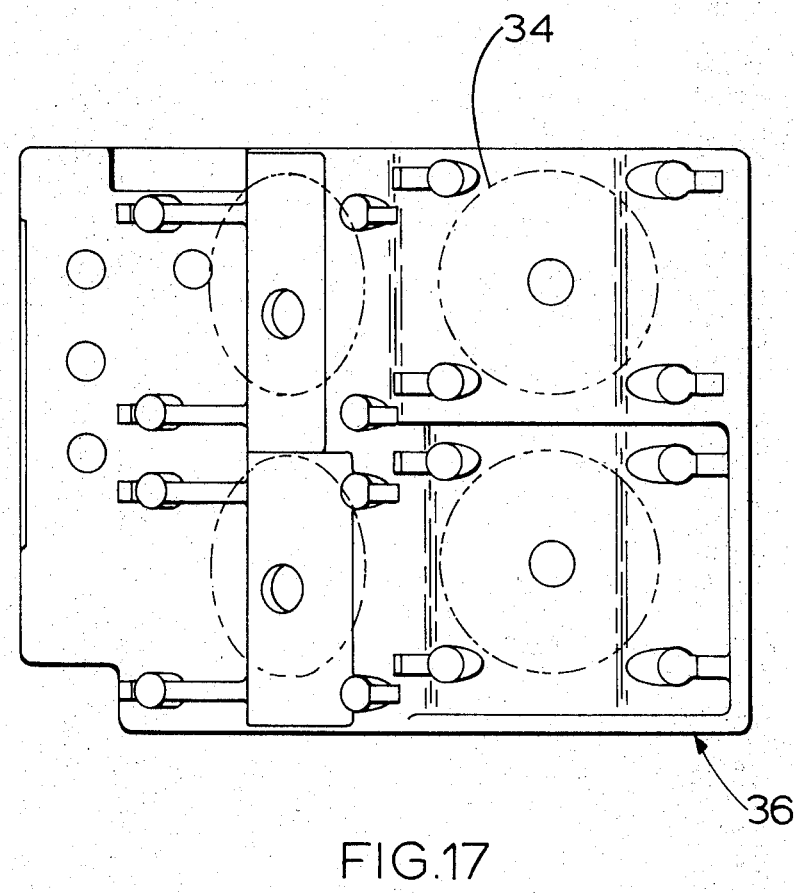
FIG. 17 is a face view of the multiple pen motor body.
Figure 18:
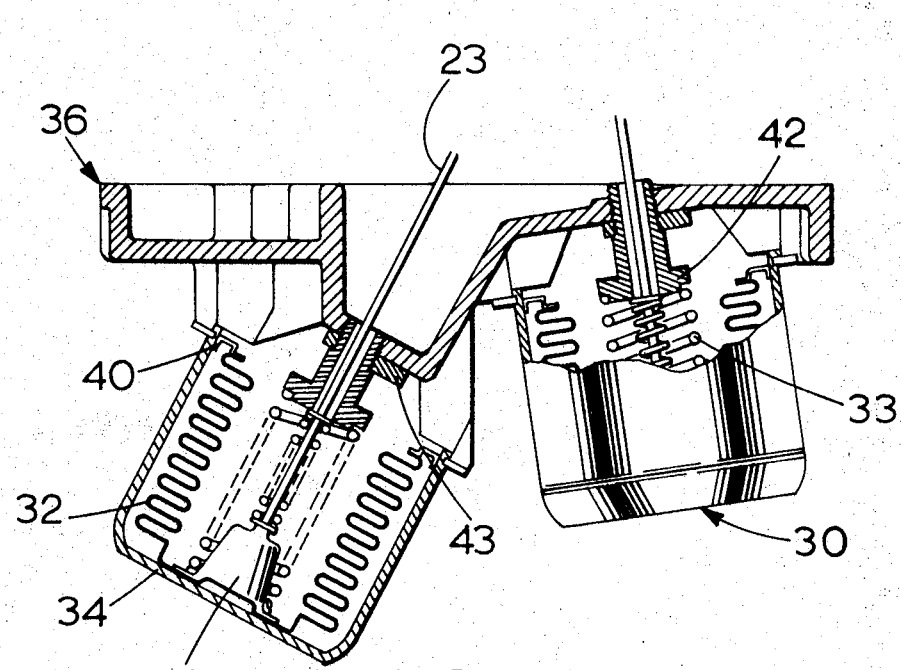
FIG. 18 is a section of the FIG. 17 structure taken on line 18—18 in FIG. 17.
Figure 19:
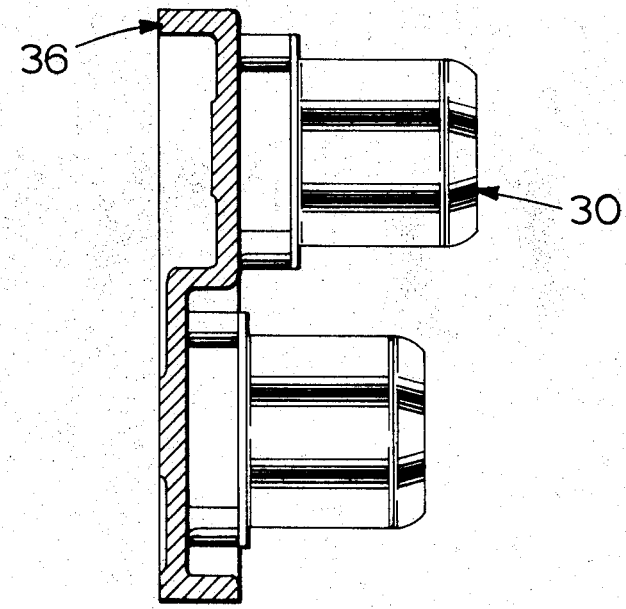
FIG. 19 is a section of the FIG. 17 structure taken on line 19—19 in FIG. 17.

FIGS. 17, 18 and 19 are various showings of the support block 36, see FIG. 9 and FIGS. 11, 12 and 13, in which the bellows cup-housing seat areas 35 are shown as angled, staggered, and at different levels, to provide the structure necessary to the use of essentially identical pen motors and pen drive systems in a multiple pen system with simplicity and compactness, in small space.

This invention, therefore, provides a new and useful pneumatic recorder pen motor, multiple pen motor assembly, and recorder pen systems including such a motor or motor assembly, and the method construction of such motors and systems.

As many embodiments may be made of the above invention, and as changes may be made in the embodiment set forth above without departing from the scope of the invention, it is to be understood that all matter hereinbefore set forth and in the accompanying drawings is to be interpreted as illustrative only and not in a limiting sense.

I claim:

1. A pneumatic recorder pen motor unit comprising a body with a seating area to accommodate the lip of a housing in the form of a cup, and a threaded opening within said seating area and through said body,
   a cup-housing lip-seating on said seating area and secured to said body,
   a cup-bellows with one end open, mounted in free-length condition in said housing in cup-bellows and cup-housing base-to-base contact nesting relation with said housing, with said open end of the bellows peripherally mounted to the inside wall of said cup-housing with said bellows in free length condition with its base engaging the base of said housing to provide a pressure chamber between the outside of said bellows and the inside of said cup-housing,
   the distance from said bellows peripheral mounting to the base of said cup-housing being such as to provide for the free length of said bellows between said cup-housing base and said peripheral mounting, said distance being different for different bellows according to the free lengths of the different bellows,
   a hollow plug screw-threadedly mounted in said threaded opening in said body,
   a bellows movement shaft mounted for movement with the closed end of said bellows, said shaft extending through the open end of said bellows, through said hollow plug and through said body openings, said shaft lengthwise "zero" position always being the same, regardless of load adjustment on said bellows, in the sense of being determined by the base of said bellows resting on the base of said housing,
   and a bellows return spring within said bellows and about said shaft, between the base of said bellows and said hollow plug,
   whereby adjustment of said hollow plug in said body opening results in load adjustment on said bellows without changing the lengthwise "zero" position of said bellows movement shaft.

2. A pneumatic recorder pen motor unit comprising a body with a seating area to accommodate the lip of a housing in the form of a cup, and a threaded opening within said seating area and through said body,
   a cup-housing lip-seated on said seating area and secured to said body,
   a bellows with one end open, mounted in said housing in cup-to-cup nesting relation therewith, with said open end of the bellows peripherally mounted to the inside wall of said cup-housing to provide a pressure chamber between the outside of said bellows and the inside of said cup-housing,
   the distance from said bellows peripheral mounting to the base of said cup-housing being at least equal to the free length of said bellows,
   a hollow plug screw-threadedly mounted in said threaded opening in said body,
   a bellows movement shaft mounted for movement with the closed end of said bellows, said shaft extending through the open end of said bellows, through said hollow plug and through said body openings,
   a bellows return spring within said bellows and about said shaft, between the base of said bellows and said hollow plug,
   whereby adjustment of said hollow plug in said body opening, results in load adjustment on said bellows,
   and wherein said bellows movement shaft is provided with spring biased telescoping structure as overrange protection in lengthwise compression, and with overall operating length adjustment means.

3. A multiple pen motor system comprising two or more arbors mounted parallel to each other and in the same plane, a pen mounting individual to each of said arbors, a single body mounting for two or more pen motor units each individual to one of said arbors and operatively connected thereto, said pen motor units all being essentially identical and interchangeable, said single body having mounting seats for said motor units, said seats being angled, staggered, and with different levels with respect to each other as necessary to operatively connect said interchangeable, identical pen motor units to said differently placed arbors,
   each of said pen motor units comprising a body with a seating area to accommodate the lip of a housing in the form of a cup, and a threaded opening within said seating area and through said body,
   a cup-housing lip-seated on said seating area and secured to said body,
   a bellows with one end open, mounted in said housing in cup-to-cup nesting relation therewith, with said open end of the bellows peripherally mounted to the inside wall of said cup-housing to provide a pressure chamber between the outside of said bellows and the inside of said cup-housing,
   the distance from said bellows peripheral mounting to the base of said cup-housing being at least equal to the free length of said bellows,
   a hollow plug screw-threadedly mounted in said threaded opening in said body,
   a bellows movement shaft mounted for movement with the closed end of said bellows, said shaft extending through the open end of said bellows, through said hollow plug and through said body openings,
   and a bellows return spring within said bellows and about said shaft, between the base of said bellows and said hollow plug,
   whereby adjustment of said hollow plug in said body opening results in load adjustment on said bellows.

References Cited

UNITED STATES PATENTS

| | | | |
|---|---|---|---|
| 2,188,177 | 1/1940 | Dube | 73—410 |
| 2,277,681 | 3/1942 | Burdick et al. | 73—410 X |
| 2,502,776 | 4/1950 | Burdick | 73—410 |
| 2,724,631 | 11/1955 | Ruhland | 346—49 |
| 2,812,995 | 11/1957 | Morris | 346—72 X |

JOSEPH W. HARTARY, Primary Examiner

U.S. Cl. X.R.

29—454; 73—410; 92—40; 346—145